United States Patent [19]

Job et al.

[11] Patent Number: 4,851,455
[45] Date of Patent: Jul. 25, 1989

[54] POLYMER COMPOSITIONS

[75] Inventors: Claude Job, Meudon; Michele Lamothe, Clamart; Martine Jamet, Paris, all of France

[73] Assignee: Raychem Pontoise, France

[21] Appl. No.: 274,612

[22] Filed: Nov. 22, 1988

Related U.S. Application Data

[62] Division of Ser. No. 815,691, Jan. 2, 1986, abandoned.

[30] Foreign Application Priority Data

Jan. 4, 1985 [GB] United Kingdom ............... 8500102

[51] Int. Cl.$^4$ .................. C08L 33/20; C08L 81/00; C08L 81/02; C08L 81/06
[52] U.S. Cl. ................................ 522/139; 522/141; 525/132; 525/150; 525/153; 427/222; 427/385.5
[58] Field of Search ............... 525/171, 535, 537, 132, 525/150, 153; 522/139, 141; 427/222, 385.5

[56] References Cited

U.S. PATENT DOCUMENTS

| | | | |
|---|---|---|---|
| 3,324,199 | 6/1967 | Tocker | 525/150 |
| 4,111,896 | 9/1978 | Gergen et al. | |
| 4,126,602 | 11/1978 | Salee | |
| 4,510,289 | 4/1985 | Fox et al. | 525/903 |
| 4,536,544 | 8/1985 | Matzner et al. | 525/153 |

FOREIGN PATENT DOCUMENTS

| | | |
|---|---|---|
| 0030414 | 6/1981 | European Pat. Off. |
| 0080097 | 6/1983 | European Pat. Off. |
| 0090404 | 10/1983 | European Pat. Off. |
| 1221083 | 2/1971 | United Kingdom |
| 1344093 | 1/1974 | United Kingdom |
| 1432709 | 4/1976 | United Kingdom |
| 1433688 | 4/1976 | United Kingdom |
| 1577459 | 10/1980 | United Kingdom |

*Primary Examiner*—Allan M. Lieberman
*Attorney, Agent, or Firm*—Yuan Chao; Edith A. Rice; Herbert G. Burkard

[57] ABSTRACT

Self-cyclisable polymer such as polyacrylonitrile formed within aromatic polymer matrix is heat treated to improve the glass transition temperature and flow characteristics of the aromatic polymer. Polyaryletherketones are preferred as the matrix.

14 Claims, No Drawings

POLYMER COMPOSITIONS

This application is a Division of application Ser. No. 06/815,691, filed Jan. 2, 1986, now abandoned.

This invention relates to polymer compositions comprising aromatic polymers and to methods of making such compositions.

Aromatic polymers are well known as engineering polymers, thermoplastic aromatic polymers tending to have relatively high melting points (Tm) and glass transition temperatures (Tg) which give them structural strength at elevated temperatures below Tg without any need for cross-linking or thermosetting. However, some industrial applications approach or exceed the limits of performance of known aromatic polymers.

The present invention relates to aromatic polymer compositions having improved performance characteristics.

The invention accordingly provides a polymer composition comprising an intimate mixture of (A) a linear thermoplastic aromatic polymer wherein the arylene units are interspersed with one or more kinds of non-alkyl linkages other than ether linkages, and (B) a heat-reacted self-cyclisable second polymer.

It will be understood that the "intimate mixture" comprises the polymers (A) and (B) regardless of whether or not (A) and (B) may have been linked to each other to some extent, as in graft or block copolymers.

The proportion of polymer B may be varied considerably, for example within the range from 1 to 60% by weight, preferably 2 to 50%, more preferably 2 to 40%. The presence of relatively small amounts e.g. 2 to 28% by weight of the cyclised second polymer in the composition with the aromatic polymers in question, in accordance with the present invention, is capable of raising Tg significantly and/or improving the solvent resistance, or high temperature elongation, creep, or other characteristics of the aromatic polymers, thus upgrading them to meet performance requirements not attainable by the original aromatic polymers alone. Higher proportions of (B) are not excluded. It may be preferable to form a molecularly interpenetrating network of the polymers (A) and (B). However, the aforesaid improvements may be achieved without necessarily forming a true molecularly interpenetrating network. Preferably the second polymer is self-cyclisable by virtue of pendant chains or groups containing nitrile linkages. The polymer (B) may be graftable onto the polymer (A), in which case it will preferably have been so grafted, e.g. by exposure to ionising radiation.

Polyacrylonitrile (PAN) is preferred as polymer (B), ion which connection it is believed that polymer compositions comprising an intimate mixture of self-cyclisable polymer (B), preferably PAN, with a linear thermoplastic aromatic polymer (A) wherein the arylene units are interspersed with one or more kinds of non-alkyl linkages other than ether linkages and sulphone linkages, preferably free from sulphone linkages, are new in themselves. The properties of such compositions will preferably be modified by reaction of the polyacrylonitrile in the mixture. Polyaryletherketones and polyaryletherimides are especially preferred as polymer (A).

The term "self cyclisable polymer" is used herein to refer to a polymer capable of reacting within its own molecule to form a cyclic structure in the absence of, or in addition to, any aromatic rings which may be included in the polymer molecule. Useful self-cyclisable polymers may, for example, comprise units derived from acrylonitrile or methacrylonitrile, preferably formed by heating PAN or polymethacrylonitrile (PMAN) to a temperature which brings about cyclisation by reaction of pendant nitrile groups within the polymer chain; or units derived from methylvinylketone, preferably by cyclisation of polymethylvinylketone (PMVK). The self-cyclisable polymers may undergo reactions other than cyclisation.

References to a "significant degree of reaction" and reaction of a "significant proportion of the linkages" will be understood to mean levels of reaction which produce a discernable useful effect on one or more properties of the compositions. Preferably, the reaction will be caused to proceed for sufficient time that the polymer (B) is reacted to the maximum possible extent under the conditions used.

The composition of this invention may be formed into shaped articles, and may be protonated or sulphonated to produce useful new materials, for example for making ion exchange membranes Films and fibres may be formed from the compositions of the invention, and these may be streched to impart heat recovery.

It is preferred to form the composition by reaction of a self-cyclisable polymer in intimate mixture with the aromatic polymer, preferably by heating the mixture to a temperature which causes cyclisation or other reaction to occur. An interpenetrating network may be (but is not necessarily) obtained when the second polymer, or a precursor polymer reactable to form it, is formed by polymerisation of a monomer or oligomer in intimate mixture with the aromatic polymer. That polymerisation can be effected by exposing the mixture to heat in the presence of a suitable freeradical generator, eg a peroxide, or to ionising radiation, for example high-energy electron beam or gamma radiation. Exposure of the resulting polymer to such radiation may also be beneficial, for example producing cross-linking and/or grafting of suitable polymers to improve the physical properties of the composition.

Although some improvement in properties may be achieved by mixing the second polymer, or a polymer reactable to form it, directly into the aromatic polymer, it is preferred to cause the aromatic polymer to absorb the aforesaid monomer or oligomer in liquid or gaseous form to provide the intimate mixture, followed by the polymerisation of the absorbed monomer or oligomer. Aromatic polymers which can exist both in crystalline and in amorphous states are preferably used in the amorphous state for the absorption process, but may then be converted to the crystalline state. Crystalline polymers which can be adequately treated are not excluded.

Reaction conditions will be chosen to suit the materials used. For example, temperatures of 200° to 400° C., preferably 250° to 320° C., especially 290° to 310° C. are suitable for cyclisation of polyacrylonitrile, polymethacrylonitrile, and polymethylvinylketone. Suitable heating times, for example are 1 hour at 300° C., or 20 minutes at 380° C. and reaction during moulding or otherwise melt processing the polymer is preferred. The reaction atmosphere may be inert gas, e.g. argon or nitrogen, but is preferably air since oxidation of cyclised PAN produces the most stable form of cyclised polymer.

It will be understood that references to aromatic polymers mean polymers which have arylene units incorporated in the repeating unit of their backbone chain, not merely appended as side groups to the chain as for example in the case of polystyrene. Preferably the aromatic polymer will have no two adjacent aliphatic carbon atoms in its backbone chain and preferably will be substantially free from aliphatic unsaturation. References to arylene groups being "interspersed" with various linkages are not intended to imply any particular regularity or pattern of interspersion, and do not exclude the presence of linkages other than those specifically stated to be present.

Preferred aromatic polymers are the poly(aryl ether) resins which may be described as linear, thermoplastic polymers having the repeat unit of the formula

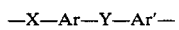

wherein Ar and Ar' are divalent aromatic moieties bonded to X and Y through aromatic carbon atoms and wherein X is ether and Y is carbonyl, sulfone, or thioether.

Preferably Ar and Ar' are independently selected from substituted and unsubstituted phenylene and substituted and unsubstituted polynuclear aromatic moieties. The term "polynuclear aromatic moieties" is used to mean aromatic moieties containing at least two aromatic rings, which can be fused or joined by a direct bond or a linking group. Such linking groups include, for example, carbonyl, ether, sulfone, thioether, amide, imide, phenoxy, azo, alkylene, perfluoroalkylene, carbonate, and the like.

The polyarylene polyethers may be prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction but the unique facility of these solvents to promote the reaction to a high molecular weight product provides the critical tool necessary to secure sufficiently high molecular weight aromatic ether products.

The polymers may also be prepared in a two-step process in which a dihydric phenol is first converted in situ in the primary reaction solvent to the alkali metal salt by the reaction with the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salt of the dihydric phenol is admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

Preferred forms of the polyarylene polyethers are those prepared using the dihydric polynuclear phenols of the following four types, including the derivatives thereof which are substituted with inert substituent groups

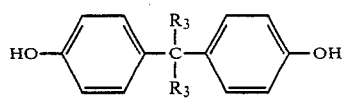

in which the $R_3$ group represents independently hydrogen, lower aryl and the halogen substituted groups thereof, which can be the same or different;

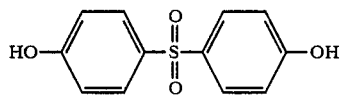

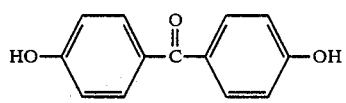

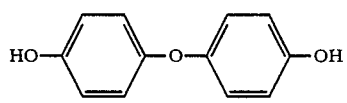

and substituted derivatives thereof.

It is also possible to use a mixture of two or more different dihydric phenols to accomplish the same ends as above.

In order to secure the high polymers, the system should be substantially anhydrous, and preferably with less than 0.5 percent by weight water in the reaction mixtures.

The poly(aryl ether)s have a reduced viscosity of from about 0.4 to about 1.5 as measured in an appropriate solvent at an appropriate temperature depending on the particular polyether, such as methylene chloride at 25° C.

Poly(arylene ethers) having the following repeat units (the simplest repeat unit being designated for a given polymer) are preferred:

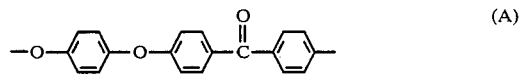 (A)

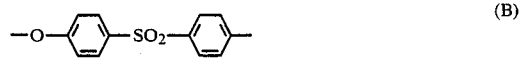 (B)

 (C)

and

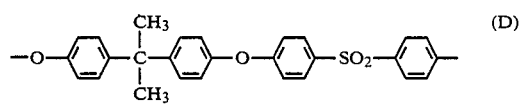 (D)

These repeat units can be named in various ways, for example (C) poly(carbonyl-p-phenylene-p-oxyphenylene).
(A) poly(carbonyl-p-phenylene-p-oxyphenylene-p-oxyphenylene).
(B) poly(sulfonyl-p-phenylene-p-oxyphenylene).
(D) poly(sulfonyl-p-phenylene-p-oxyphenylene-p-isopropylidene phenylene-p-oxyphenylene).

The term "aromatic ether ketone polymer" or "polyaryletherketone" is used herein to include polymers containing arylene, ether and ketone linkages in the polymer chain. Other linking groups such as sulphone, thioether, amide, imide, azo, alkylene, perfluoroalkylene, carbonate or the like may also be present. By analogy the term "aromatic ether sulphone polymer" or "polyarylethersulphone" is used herein to include polymers containing arylene, ether and sulphone linkages in the polymer chain. Other linkages such as carbonyl and those listed above may also be present. Polyarylene sulphides such as "RYTON" may also be suitable for the present invention. Polyarylsulphones are also suitable for the present invention.

The polyaryletherketones may be better defined as polymers having the repeat unit of the formula —CO—Ar—CI—Ar'— wherein Ar and Ar' are aromatic moieties at least one of which contains a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking-group. Such linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

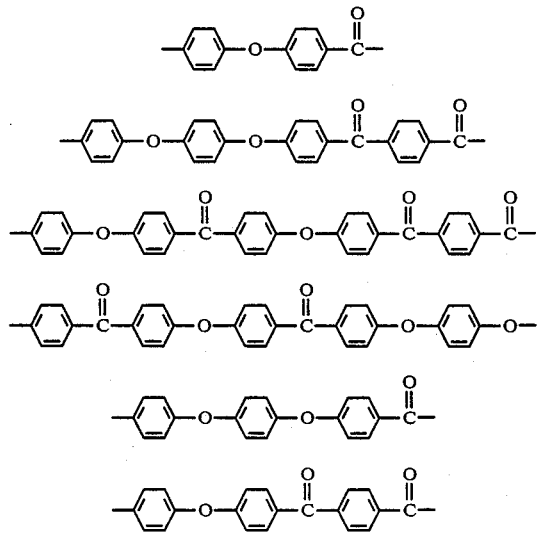

Poly(aryl ether ketones) can be prepared by known methods of synthesis. Preferred poly(aryl ether ketones) can be prepared by Friedel-Crafts polymerization of a monomer system comprising:

(I) phosgene or an aromatic diacid dihalide together with (II) a polynuclear aromatic comonomer comprising:
 (a) H—Ar"—O—Ar"—H
 (b) H—(Ar"—O)$_n$—Ar"—H wherein n is 2 or 3
 (c) H—Ar"—O—Ar"—(CO—Ar"—O—Ar")$_m$—H wherein m is 1, 2 or 3
 or
 (d) H—(Ar"—O)n—Ar"—CO—Ar—(O—Ar")$_m$—H wherein m is 1, 2, or 3, and n is 2 or 3 or (II) an acid halide of the formula: H—Ar"—O—[(Ar"—CO$_p$—(Ar"—O)$_q$—(Ar"—CO)$_r$]$_k$—Ar'—CO—Z wherein Z is halogen, k is 0, 1 or 2, p is 1 or 2, q is 0, 1 or 2 and r is 1, 1 or 2;
or (III) an acid halide of the formula: H—(Ar"—O)-$_n$—Ar"—Y wherein n is 2 or 3 and Y is CO—Z or CO—Ar"—CO—Z where Z is halogen; wherein each Ar" is independently selected from substituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system;
and (C) a non-protic diluent in an amount from 0 to about 93% by weight, based on the weight of the total reaction mixture.

The aromatic acid halides employed are preferably dichlorides or dibromides. Illustrative acid halides, and polynuclear aromatic comonomers which can be used with such acid halides are described together with further details of this process for producing poly(aryl ether ketones), in our copending U.S. application Ser. No. 594,503, filed Mar. 29 1984, now abandoned.

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain linkages other than those specified above, can be employed as long as one or more of the comonomers used contains at least one ether oxygen linkage.

The monomer system can also contain up to about 30 mole % of a comonomer such as a sulfonyl choride which polymerizes under Friedel-Crafts conditions to provide ketone/sulfone copolymers.

Some specific examples of the preparation of polymer compositions according to the present invention will now be described by way of further illustration.

Example 1

A sample of poly aromatic ether ether ketone* (PEEK) amorphous film, 130 micrometres thick, is soaked in a large excess of distilled acrylonitrile (AN), at 40° C., for 16 hours. The swollen film is then roughly dried between 2 filter papers and introduced in a glass ampoule. The ampoule is degassed under vacuum and sealed.

The ampoule is irradiated to 20 Mrad with a 6 Mev electron beam.

- DSC : 10° C./mn. (Tg is as defined for Tf in ASTM D3418).

Mechanical properties of the products are plotted in Table 1.

TABLE 1

|  | 20 degrees C. | | | | 180 degrees C. | | | | 280 degrees C. | | | |
| --- | --- | --- | --- | --- | --- | --- | --- | --- | --- | --- | --- | --- |
|  | Mod (MPa) | YS (MPa) | TS (MPa) | Elo % | Mod (MPa) | YS (MPa) | TS (MPa) | Elo % | Mod (MPa) | YS (MPa) | TS (MPa) | Elo % |
| (1)* | 2625 | 91 | 100 | 180 | 330 | 17 | 100 | 290 | changes during tests | | | |
| (2)* | 2850 | 99 | 100 | 180 | 465 | 31 | 92 | 270 | 250 | 12 | 60 | 300/370 |
| (3)* | 2850 | 103 | 88 | 160 | 685 | 33 | 69 | 250 | 245 | 12 | 40 | 320 |
| (4)* | 2765 | 96 | 84 | 19 | 960 | 42 | 42 | 50 | 320 | 13 | 18 | 136 |

(1)* = cristalline PEEK produced by heating amorphous PEEK for 1 hour at 200 degrees C.
(2)* = cristalline PEEK produced by heating amorphous peek for 1 hour at 300 degrees C.
(3)* = 5.2% modified PEEK + HT.
(4)* = 22.8% modified PEEK + HT.
Tensile tests: 25% elongation per minute+
Mod: Tensile modulus
YS: Yield stress
TS: Tensil strength
B: Ultimate elongation The sample is washed in a large quantity of DMF at RT for one night at least, then soaked in MEK at RT for 16 hours and dried under primary vacuum at 130° C. until constant weight is reached.

The final product, exhibits a weight uptake of 5.2% (PAN content).
* as supplied by I.C.I. Ltd. U.K.

Example 2

A section of film from Ex 1 above is taken just after the irradiation and soaked again in AN at 40° C. for 16 hours. It is then irradiated a second time in the same conditions as Ex. 1 soaked eventually a third time in AN, irradiated a third time, eventually soaked a fourth time and irradiated for the fourth time in the same conditions. The procedure is done with 2, 3 or 4 steps.

Sample is finally washed and dried as described in Ex. 1.

Weight uptake after 4 steps procedure is 22.4% the sample is still soluble in concentrated sulfuric acid (98% W/W) at ambient temperature; its thickness is 142 micrometres.

Mechanical properties at RT are not significantly altered.

Example 3

The procedure described in Ex. 1 and 2 is applied to PEEK film but using commercial grade AN, replacing the degassing by using a top on the glass ampoule and drying directly the sample after the last irradiation In those conditions weight uptake is 5.2% (Ex. 1) or 14% (Ex. 2, 2 steps). Samples are soluble in conc. H2SO4 at RT.

Example 4

Films from Ex. 1, 2 and 3 above are subjected to heat treatment (HT) at 300° C. for 1 hour in air between 2 glass sheets. Films so treated remain flat and darken deeply or turn black. They no longer exhibit the exotherm in DSC in the range 200-330° C. visible in films from Ex. 1, 2, 3. Tg is 153° C. (Ex. 1) or 163° C. (Ex. 2)

(1)* = cristalline PEEK produced by heating amorphous peek for 1 hour at 200 degrees C.
(2)* = cristalline PEEK produced by heating amorphous peek for 1 hour at 300 degrees C.
(3)* = 5.2% modified PEEK+HT.
(4)* = 22.8% modified PEEK+HT.
Tensile tests: 25% elongation per minute+
Mod : Tensile modulus
YS : Yield stress
TS : Tesnsile strength
B : Ultimate elongation Creep date (elongation in %) recorded after 2000 hours at 180° C. are plotted in Table 2.

TABLE 2

| Load MPa | 15 | 30 |
| --- | --- | --- |
| Crystalline PEEK* | 65% | 205% |
| 5.3% modified PEEK + HT | 7% | 170% |
| 20% modified PEEK + HT | very low | 17% |

Example 4A

Films from ex.1, 2 and 3 above are subjected to heat treatment at 280 degrees C. for 3 hours in air between 2 glass sheets. Mechanical properties of the products are plotted in table 3.

TABLE 3

|  | Mod (MPa) | YS (MPa) | TS (MPa) | Elong % |
| --- | --- | --- | --- | --- |
| 6% modified PEEEK + 280 degrees C. 3 hours | 790 | 37 | 61 | 260 |
| 20% modified PEEK + 280 degees C. 3 hours | 1100 | 46 | 40 | 50 |

Example 5

Samples from Ex. 4 were placed in ovens at 180° C. times up to 2000 hours (air). No visible change occured by these treatments. Mechanical properties remained unchanged at RT and 180° C. apart from moduli at 180° C. which increased after ageing treatments at 180° C.

Mechanical properties at 180° C. after 2000 hours at 180° C. are plotted in table 4

TABLE 4

| SAMPLES AGED 2000 H AT 180 DEGREES C. | | | | |
| --- | --- | --- | --- | --- |
|  | Mod (MPa) | YS (MPa) | TS (MPa) | Elong %* |
| Crystalline PEEK* | 455 | 20 | 91 | 275 |

TABLE 4-continued

| SAMPLES AGED 2000 H AT 180 DEGREES C. | | | | |
|---|---|---|---|---|
| | Mod (MPa) | YS (MPa) | TS (MPa) | Elong %* |
| 6% modified + HT | 1110 | 38 | 66 | 250 |
| 20% modified PEEK + HT | 1690 | 50 | 40 | 40 |

*Crystalline PEEK produced by heating amorphous PEEK for 1 hour at 200 degrees C.

Example 6

Films from Ex. 4 were placed into concentrated $H_2SO_4$ (98% w/w) at RT for different times (from a few minutes to 2 months). AN-modified PEEK remained insoluble but swelled as indicated in Table 5. (% swelling after removal from $H_2SO_4$ and several washings in water).

TABLE 5

TABLE 5

| % PAN in film | Time in $H_2SO_4$ | Aspect | % swelling in |
|---|---|---|---|
| 0 | 1 hour | soluble | |
| 5.3 | 10 minutes | stiff flat | 50 |
| | 2 months | soft flat | 600 |
| 20 | 1 hour | stiff flat | 20 |
| | 17 hours | stiff bubbles | 470 |
| | 2 months | broken in several pieces | |

Example 7

PEEK supplied by ICI was extruded to give an about 1 mm diameter rod such that little to no melt orientation was induced at the die, quenched into a tank operating at ambient T, then granulated.

(a) The granules were soaked in commercial grade acrylonitrile at 60° C., excess AN was roughly removed with filter papers and granules placed in polyethylene sealed bags. The bags were irradiated to 20 Mrad in the conditions described in Ex. 1 then the granules were dried under vacuum at 150° C. until constant weight was reached. The weight uptake is plotted in table 6

TABLE 6

| Soaking time (hours) | Weight uptake (%) |
|---|---|
| 8 | 3.5 |
| 16 | 4.3 |
| 48 | 8.6 |

(b) The granules were soaked in distilled AN at 40° C. for 4 days, roughly dried with filter papers, degassed in glass ampoules and sealed under vaccum. Irradiation was conducted as described in Ex. 1 two doses of 5 or 20 Mrad, as shown in Table 7.

TABLE 7

| Dose of (Mrad) irradiation | Weight uptake % | % N w/W** |
|---|---|---|
| 5 | 6.6 | 1.62 |
| 20 | 9.4 | 2.3 |
| 20* | 9.9 | 2.1 |

*not degassed prior irradiation.
**Nitrogen analysis performed with a Perkin Elmer (Trade Mark) CHN Analyser 240B.

Example 8

Granules from Ex. 7 were pressed after drying in a compression mold at 380° C. to produce a plaque 1.2 mm thick. The moulding had good surface finish and no obvious voiding; it exhibited insolubility when immersed in concentrated $H_2SO_4$ (at Room Temperature 24 hours+). Mechanical properties are shown in Table 8. Also 95 parts of PEEK powder were mixed with 5 parts of commercial PAN. The mixture was compression molded at 380 degrees C to produce a plaque 1.2 mm thick. The plaque was annealed at 300 degrees C. for 1 hour. Mechanical properties at 180 degrees C. are plotted in Table 8.

TABLE 8

| Mechanical properties at 180 degrees C. (50 mm/mn) | | | | |
|---|---|---|---|---|
| SAMPLES | Mod | YS | TS | Elong % |
| PEEK as molded | 450 | 23 | 65 | 220 |
| PEEK molded annealed at 300 dg C. for 1 hour | 515 | 29 | 66 | 235 |
| 5% modified PEEK as moulded | 430 | 21 | 52 | 160 |
| 5% modified PEEK moulded annealed | 580 | 30 | 34 | 85 |
| Mixture PEEK:PAN 95:5 moulded annealed | 540 | | | 40 |

Example 9

A film of polyaromaticether ketone (PEK) as described in British Patent No. 1387303 180 micrometres thick was treated as in Ex. 1 and Ex. 2 (2 steps). Weight uptakes were 7% (Ex. 1) and 12% (Ex. 2) 2 steps. Both samples are soluble in concentrated $H_2SO_4$ at RT.

After heat treatment as described in Ex. 4 both samples are black, insoluble in concentrated $H_2SO_4$ at RT and no longer exhibit exotherm in DSC in the range 200°–320° C. Tg=171° C.

Example 10

Amorphous aromatic polymer films were treated as described in Ex. 1. They include UDEL (Trade Mark) Polysulfone from UNION CARBIDE (100 micrometres thick) VICTREX (Trade Mark) Polyethersulfone from ICI Americas Inc (80 micrometres thick) ULTEM (Trade Mark) Polyaryletherimide from GENERAL ELECTRIC, blown film (40 micrometres thick)

Weight uptake and solubility data at RT are plotted in Table 9. Samples are then submitted to HT as described in Ex. 4. Colour changes and solubility data after HT are also plotted in Table 9.

TABLE 9

| Polymer Property | Poly Sulfone | Polyether sulphone | Polytherimide |
|---|---|---|---|
| Weight uptake % | 4 | 6 | 7 |
| Solubility | Soluble in conc. $H_2SO_4$ | Soluble in DMF and $CH_2CL_2$ | Soluble in DMF and $CH_2SL_2$ |
| Colour after HT | black | brown | dark brown |
| Solubility after HT | Insoluble in conc. $H_2SO_4$ | Insoluble in DMF and $CH_2CL_2$ | Insoluble in DMF and $CH_2CL_2$ |

Example 11

A further example that describes improvement afforded by our process in its application to fibers:

Amorphous fiber was obtained from poly aromatic ether ether ketone (PEEK) as supplied by ICI Ltd UK, extruded in a ¾ inches extruder with melt pump in order to introduce a minimum orientation.

Pieces of fiber were treated as described in Ex. 1 and 2 (2 steps) weight uptake were 7% and 14%. Mechanical properties are shown in Table 10.

TABLE 10

| | Mechanical properties at 180 degrees C. (50 mm/mn) | | |
|---|---|---|---|
| SAMPLES | YS Mpa | TS Mpa | elong % |
| PEEK annealed at 250 degrees C. 4 h | 33 | 57 | 170 |
| 7% modified PEEK annealed 300 deg C. 1 hour | 40 | 45 | 100 |

Example 12

Aromatic Polymer Composite APC-1* (Trade Name) from I.C.I. was heated at 380° C. and quenched in water at RT to render it amorphous.

It was then treated as described in Ex. 1 and 2 without washing in DMF/MEK. Final weight uptake was 1.4% AND 3.6%.

Samples were heat treated as described in Ex 4, then submitted to Dynamic Mechanical Analysis (DMA).** When compared to regular APC-1, our heat treated product exhibits an improvement in Young's modulus (up to 50% increase at 200° C.) see curve 1, which plots the ratio of the modified : unmodified modulus against temperature.

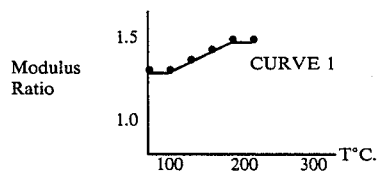

*as supplied by ICI Ltd UK and described is provisional data sheet APC PD1 ICI Petrochemicals and Plastics division 1982.
**A DU PONT Thermoanalyser No. 982.

Example 13

Films from Ex. 1 were used for lap shear bonds on mild steel (cure time 10 mn at 375° C. under press).

Lap shear test at 200° C. showed no loss of adhesion properties when compared to unmodified poly aromatic ether ether ketone.

Example 14

Films from Ex. 6 were used for conductivity measurements: films in the swollen state were connected to 2 electrodes (20 mm path between the electrodes) at RT to measure the conductivity along the sample. Results are plotted in Table 11.

TABLE 11

| % modified PEEK | Time in $H_2SO_4$ | Conductivity $ohm^{-1} cm^{-1}$ |
|---|---|---|
| 12 | 1 hour | $4 \times 10^{-4}$ |
| | 17 hours | $4 \times 10^{-4}$ |
| | 2 months | $16 \times 10^{-4}$ |

Example 15

(a) PEK* amorphous powder was soaked in distilled AN at 40° C. during 16 h. It was then roughly dried with filter paper, degassed in glass ampoules and irradiated under vacuum at RT, with rays from $^{60}Co$. Dose rate 300 rad/min, doses from 34 to 200 Krad.

The product was then dried at 130° C. under vacuum until constant weight was reached. PAN content determined by IR is in the range 2 to 24% related to PEK.

(b) Material produced with 105 Krad (17% PAN) was pressed in a compression mould at 400° C. The moulding had good surface finish and was insoluble in concentrated $H_2SO_4$ at RT.

* See Ex. 9.

Example 16

A material of same composition as obtained in Ex. 15 was produced by soaking 5 g of PEK powder for 16 hours in 26 ml of distilled AN containing 10 mg azo bisisobutyro nitrile (AIBN), degassing and heating at 50° C. for 45 mn.

Powders are washed with methanol, dried at 130° C. under vacuum until constant weight is reached.

PAN content as determined by IR is 15.4%.

Example 17

(a) Distilled AN is polymerized in aqueous solution by irradiation with the gamma rays of 60 Co. Polyacrylonitrile (PAN) powder formed has molecular weight : 467.000 measured by viscosity in DMF $[\eta] = 3.92 - 10^{-4} M_w^{0.75}$ (b) PAN powder obtained in a) is mixed with PEK powder : 16 parts of PAN for 100 parts of PEK. The mixture is molded in a compression mold for 20 minutes at 380° C. The molding does not exhibit any exotherm in the range 200°–330° C in DSC traces.

Example 18

Procedure from Ex. 1 was reproduced but using methacrylonitrile (MAN) instead of acrylonitrile.

Weight uptake is 8.2%, sample soluble in $H_2SO_4$ at RT. After a heat treatment as described in Ex. 4 the sample turns red brown, loses the major part of its weight increase swells in conc. $H_2SO_4$ but does not dissolve.

Mechanical properties are plotted in Table 12.

TABLE 12

| TEMPERATURE OF TEST | RT | | | 180 deg C. | | |
|---|---|---|---|---|---|---|
| Property (MPa) | Mod | YS | TS | Mod | YS | TS |
| PEEK 8.2% MAN + HT | 2150 | 100 | 80 | 715 | 35 | 62 |

Example 19

Methylvinylketone (MVK) was used in replacement of in conjunction with AN to prepare samples with the procedure described in Ex. 1 or Ex. 3 (1 step).

Weight uptake after drying are plotted versus soaking solution composition and experimental conditions in Table 13.

TABLE 13

| Soaking solution composition (% V/V) | Distilled or commercial grade products D/CG | Vacuum/air V/A | Weight uptake % |
|---|---|---|---|
| MVK 100% | D | V | 12 |
| MVK 100% | D | A | 11 |
| MVK 100% | CG | A | 11 |
| MVK 12% AN 88% | D | V | 7 |
| MVK 12% AN 88% | D | A | 7 |
| MVK/AN 12/88 | CG | A | 5 |

Mechanical properties are shown in Table 14.

TABLE 14

| SAMPLE | MOD MPA | YS MPa | ELONG % |
|---|---|---|---|
| PEEK modified with 11% MVK + HT | 1050 | 37 | 14 |

Example 20

A sample as obtained in Ex.11 was heat treated as described in Ex.4 and stretched at 230 degrees C with expansion ratio 100%. Recovery stress was then recorded a 230 degrees C (Instron tensile tester with hot chamber)

|  | Recovery stress |
|---|---|
| Crystalline PEEK(*) | 40.60 MPa (5900 PSI) |
| Crystalline PEEK(**) | 44.13 MPa (6400 PSI) |
| 7% modified PEEK + HT | 52.40 MPa (7600 PSI) |

(*)annealed at 200 degrees C. for 1 h.
(**)annealed at 300 degrees C. for 1 h.

Example 21

Samples from Ex.7 were processed into shaped parts with an Arburg injection molding machine (3 Zones with T 360—360-370 degrees C, mold at 250 degrees C). The molded part (13 g) has good surface finish and no obvious voiding either on examination of the surface or after cold fracture.

A further possibility is to coprocess polymer granules modified with , for example, 9% PAN according to the present invention with granules of the same polymer, e.g. PEEK, as received from the supplier to provide a PAN content of , for example, 5%. The processing aids contained in the unmodified polymer (which aids may be partly neutralised by the PAN treatment) may then assist in processing while the PAN modified material contributes to improving the properties of the polymer composition.

Especially preferred embodiments of the invention are those produced by heating an intimate mixture of an aromatic polymer, preferably a polyaryletherketone, especially a polyaryletheretherketone, with a cyclisable polymer, preferably polyacrylonitrile, polymethacrylonitrile, or polymethylvinylketone, to a temperature within the cyclisation range for the cyclisable polymer for sufficient time and using sufficient cyclisable polymer to enhance the physical properties of the resulting mixture at elevated temperatures, preferably at temperatures above Tg of the aromatic polymer alone.

We claim:

1. A method of making a polymer composition comprising an intimate mixture of
   (A) a linear thermoplastic aromatic polymer selected from the group consisting of
   (I) polymers having the repeat unit —X—Ar—Y—Ar'— wherein Ar and Ar' are divalent aromatic moieties bonded to X and Y through aromatic carbon atoms and X is ether and Y is carbonyl, sulfone, or thioether;
   (II) polyarylsulfones; and
   (III) polyarylenesulfides;
   and
   (B) 1 to 60% by weight of a second polymer which has been self-cyclized by heating;
   comprising the steps of:
   (a) providing the thermoplastic aromatic polymer;
   (b) permitting the thermoplastic aromatic polymer to absorb a monomeric or oligomeric precursor of the second polymer;
   (c) polymerizing the monomeric or oligomeric precursor to form uncyclized second polymer; and
   (d) heating to a temperature between 200° and 400 ° C. to cyclize the uncyclized second polymer.

2. A method according to claim 1, wherein the thermoplastic aromatic polymer is a polyaryletherketone.

3. A method according to claim 2, wherein the polyaryletherketone has a repeat unit selected from the group consisting of

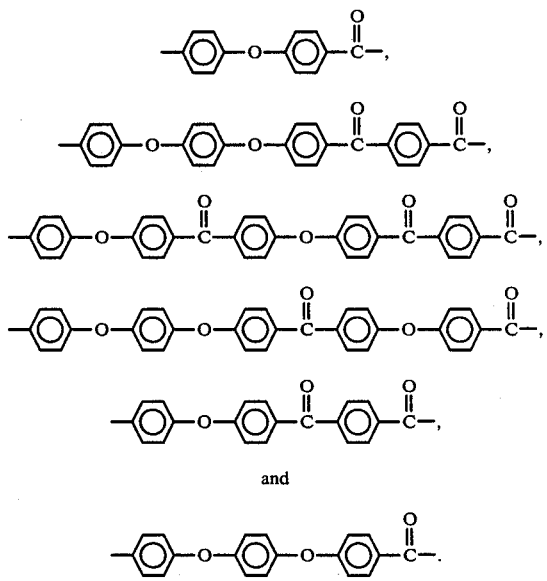

4. A method according to claim 1, wherein the thermoplastic aromatic polymer has a repeat unit of the formula:

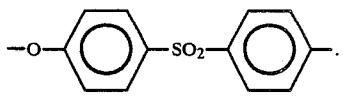

5. A method according to claim 1, wherein the thermoplastic aromatic polymer has a repeat unit of the formula:

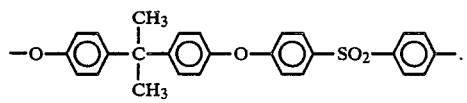

6. A method according to claim 1, wherein the thermoplastic aromatic polymer is a polyarylenesulfide.

7. A method according to claim 1, wherein the second polymer is polyacrylonitrile.

8. A method according to claim 1, wherein the second polymer is polymethacrylonitrile.

9. A method according to claim 1, wherein the second polymer is polymethylvinylketone.

10. A method according to claim 2, wherein the thermoplastic aromatic polymer is in the amorphous state when the monomeric or oligomeric precursor is absorbed.

11. A method according to claim 1, wherein the monomeric or oligomeric precursor is polymerized by exposure to ionizing radiation.

12. A method according to claim 1, wherein the monomeric of oligomeric precursor is polymerized by exposure to electron beam radiation.

13. A method according to claim 1, wherein the monomeric or oligomeric precursor is polymerized by exposure to heat in the presence of a free-radical generator.

14. A method according to claim 1, wherein the heating step is performed at a temperature between 250° and 320° C.

* * * * *